United States Patent
Kaiser

(10) Patent No.: US 9,840,323 B1
(45) Date of Patent: *Dec. 12, 2017

(54) DRONE AIRCRAFT

(71) Applicant: Kaiser Enterprises, LLC, Washington, DC (US)

(72) Inventor: James Kaiser, Washington, DC (US)

(73) Assignee: Kaiser Enterprises, LLC, Washington, DC (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/058,708

(22) Filed: Mar. 2, 2016

Related U.S. Application Data

(63) Continuation-in-part of application No. 14/712,062, filed on May 14, 2015, now Pat. No. 9,555,879.

(60) Provisional application No. 62/011,418, filed on Jun. 12, 2014.

(51) Int. Cl.
*B64C 27/10* (2006.01)
*B64C 27/14* (2006.01)
*B64D 17/80* (2006.01)
*B64C 25/06* (2006.01)
*B64D 35/06* (2006.01)

(52) U.S. Cl.
CPC .............. *B64C 27/10* (2013.01); *B64C 25/06* (2013.01); *B64C 27/14* (2013.01); *B64D 17/80* (2013.01); *B64D 35/06* (2013.01); *B64C 2201/024* (2013.01)

(58) Field of Classification Search
CPC ......... B64C 27/10; B64C 27/14; B64C 27/20; B64C 2201/027; B64D 35/06
See application file for complete search history.

(56) References Cited

U.S. PATENT DOCUMENTS

| | | | |
|---|---|---|---|
| 2,521,684 | A | 9/1950 | Bates |
| 2,740,595 | A | 4/1956 | Bakewell |
| 2,935,275 | A | 5/1960 | Grayson |
| 3,470,765 | A | 10/1969 | Campbell |
| 3,690,597 | A | 9/1972 | Di Martino |
| 4,787,573 | A | 11/1988 | Pauchard |
| 5,072,892 | A | 12/1991 | Carrington |
| 5,807,202 | A | 9/1998 | Sammataro |
| 6,306,912 | B1 | 10/2001 | Kirjavainen |
| 7,604,198 | B2 | 10/2009 | Petersen |
| 8,033,498 | B2 | 10/2011 | Blackburn |
| 8,979,016 | B2 | 3/2015 | Hayden, III |
| 9,555,879 | B1 * | 1/2017 | Kaiser .................... B64D 35/06 |
| 2003/0136875 | A1 | 7/2003 | Pauchard |

(Continued)

*Primary Examiner* — Joseph W Sanderson
(74) *Attorney, Agent, or Firm* — Blank Rome LLP

(57) ABSTRACT

A drone aircraft has a main body with a circular shape and a circular outer periphery. One or more rotor blades extend substantially horizontally outward from the main body at or about the circular outer periphery. In addition, one or more counter-rotation blades extend substantially horizontally outward from said main body at or about the circular outer periphery, but vertically offset from the main rotor blades. The main rotor blades are connected to a first annular gear that rotates in a first direction and the counter-rotation blades rotate are connected to a second annular gear that rotates in a second direction that is opposite the first direction for anti-torque. Planetary gears simultaneously drive the first and second annular gear at about the same speed.

12 Claims, 6 Drawing Sheets

(56) References Cited

U.S. PATENT DOCUMENTS

2005/0067527 A1     3/2005   Petersen
2009/0121076 A1     5/2009   Blackburn

* cited by examiner

DRONE AIRCRAFT

RELATED APPLICATIONS

This application is a continuation-in-part of U.S. Pat. No. 9,555,879, filed May 14, 2015, which claims the benefit of U.S. Provisional Application No. 62/001,418, filed May 21, 2014. The entire contents of those applications are incorporated herein by reference.

BACKGROUND OF THE INVENTION

Field of the Invention

The present invention relates to a design for a drone aircraft. More particularly, the present invention relates to an aircraft, and particularly a drone, having a circular shape and blades positioned about the outer circumferential periphery.

Background of the Related Art

In current helicopters, a mechanically intricate system featuring a vertical drive shaft (mast) connected to an engine (gas piston or jet turbine) turn a series of blades that are very elongated and narrow. The rotational spinning of the blades about the mast at a sufficient RPM creates a lift factor consistent with the Bernoulli Principle. One way to move the helicopter forward or backward, is to provide a mechanical assembly on the drive shaft that can change the angle of the shaft either forward or backward, thus tilting the blades forward to achieve forward movement and backward to achieve backward movement. Similarly, another intricate mechanical linkage allows for the pilot to change the blades' angle of attack thus increasing and decreasing the lift factor of the blades. The drive system is at a mechanical disadvantage since it is positioned at the vertical vertex of rotation, requiring a high horsepower requirement to provide ample RPMs for the greatly elongated and narrow blades to achieve lift.

This entire drive system is permanently affixed well above the helicopter's horizontal centerline. However, this creates a top heavy platform, and many helicopter crashes result in the craft rolling or flipping on contact. To prevent the main lift blades spinning force to cause the craft to spin uncontrollably, a geared mechanical link from the main engine and mast to a tail rotor counteracts the main blades effect and allows the craft to remain stable.

Despite many variations of airframe body designs (improved aerodynamic bodies), there remains essentially an identical center line torque at the vertex drive systems.

Current industry design configurations for rotor type drones/Unmanned Aircraft Vehicles (UAVs) usually have 3-6 vertically mounted motors connected to propellers, each on a single vertical shaft. This configuration/design commonality has an inherent weakness. If any one of the motor/propeller assemblies fail, the drone/UAV craft will become unstable and experience uncontrollable flight.

SUMMARY OF THE INVENTION

Accordingly, it is an object of the invention to provide an aircraft that is highly stable, maneuverable, and mechanically efficient, and especially one that can be utilized as a helicopter and avoids the dangers involved during a mechanical failure.

This invention changes the historical concept of helicopters by modifying the entire mechanical and lift structure mechanisms. An aircraft is provided that has the rotor blades at the outer perimeter of the craft and at or below the horizontal centerline of the craft. Much shorter and wider rotor blades are utilized, and the angle of attack is permanently fixed at a predetermined constant lift position. The rotor blades are coupled with the drive system at or below the center mass of the craft. The invention alleviates the need for a blade tilt system and achieves greatly enhanced mechanical advantage, including increased torque at the blade's drive point.

In accordance with the invention, a lift system is provided that includes internally mounted jet engines linked to electric generators that produce electric power for three (3) electric motors. The motors are linked via a series of gears that drive large annular/ring gears positioned about the entire perimeter of the craft and freely roll one on top the other, each on a series of roller bearings. The annular/ring gears are directly attached to both main lift blades and counter-rotation blades. Lateral movement and turning function of the craft are achieved by vectoring the exhaust of the jet engines using ducts out the side of the craft and/or a rudder affixed to the bottom rear of the craft.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
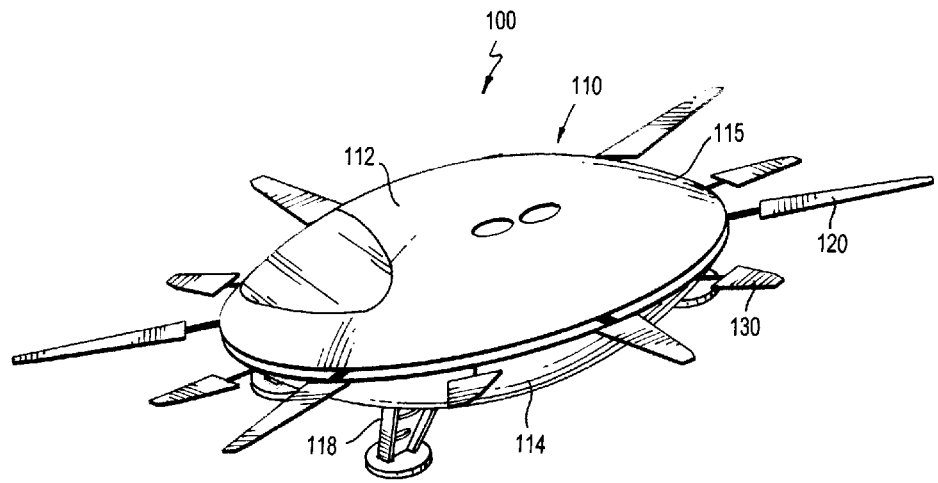
FIG. 1 is a perspective view of the aircraft in accordance with a preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 2:
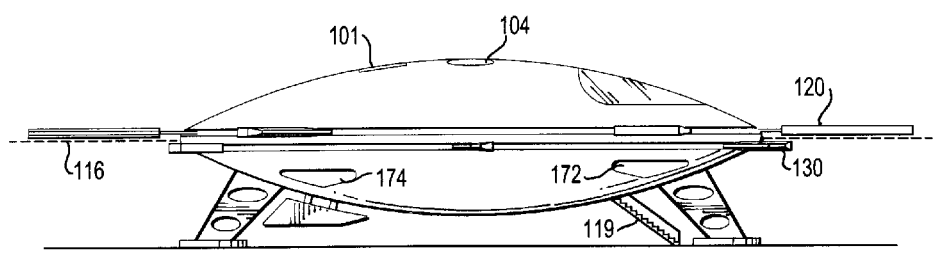
FIG. 2 is a side view of the aircraft of FIG. 1.

Turning to the drawings, FIGS. 1-2 shows an aircraft 100 in accordance with one preferred embodiment of the invention. The aircraft 100 includes a main housing or body 110, lift blades 120 and counter-rotation (or anti-torque) airfoil blades 130. The main body 110 has an upper body portion 112, a lower body portion 114, landing gear 118, and other usual features such as a cockpit, seating and windows. The main body 110 receives the pilot and any passengers and/or product(s) to be transported from below the craft via a transport device 119 such as stairs and/or a conveyor belt that extends from either the lower body portion 114 or the upper body portion 112. As shown, the aircraft 100 has a different design for an aircraft, and is especially suited as a helicopter-type aircraft. The landing gear 118 can extend downward from the lower body portion 114, and can optionally be retracted to a compartment inside the lower body 114 when the craft 100 is in flight.

The main body 110 has a generally circular shape when viewed from the top (i.e., a horizontal cross-section) (FIG. 1) and an oval or oblong shape when viewed from the side (i.e., a vertical cross-section) (FIG. 2). That provides an aerodynamic shape for the aircraft 100. A middle or central horizontal axis 116 is formed where the upper and lower body portions 112, 114 come together. Thus, the central horizontal axis or line 116 extends midway from the top and bottom of the main body 110. The upper body portion 112 is dome-shaped with a smaller top part and becoming wider toward the central horizontal axis 116. The lower body portion 112 has an inverted dome-shape with a smaller bottom part and becoming wider toward the central horizontal axis 116. Thus, the main body 110 has a circular central outer periphery or outer perimeter 115 that forms the widest and outermost part of the main body 110.

The upper and lower body portions 112, 114 can be formed separately and coupled together such as by welding, or the entire main body 110 can be a single piece integrated device. In addition, while the upper and lower body portions 112, 114 are shown being substantially equal in size and shape, other suitable embodiments can be provided. For instance, the upper body 112 can be smaller and differently shaped than the lower body 114. In addition, both the upper and lower bodies 112, 114 need not be circular or dome-shaped but can have a different shape (such as rectangular or square), with an outer circular ring (either internal or external to the main body) for the blades.

Figure 4:
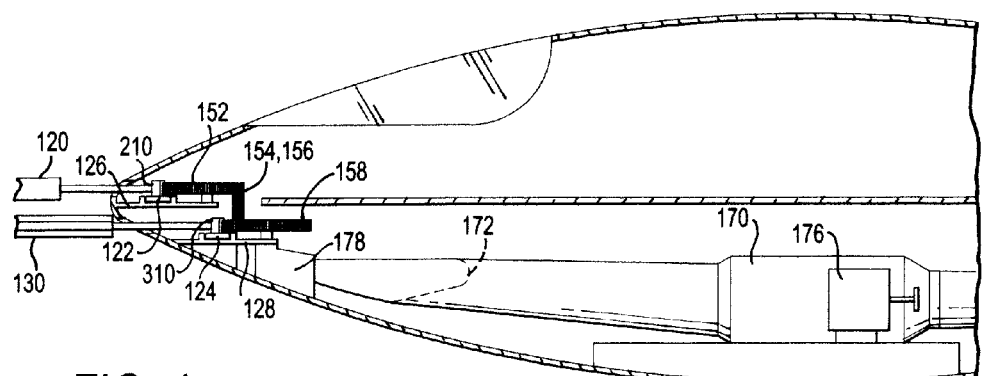
FIG. 4 is an enlarged side view of a portion of FIG. 3.
Figure 7:
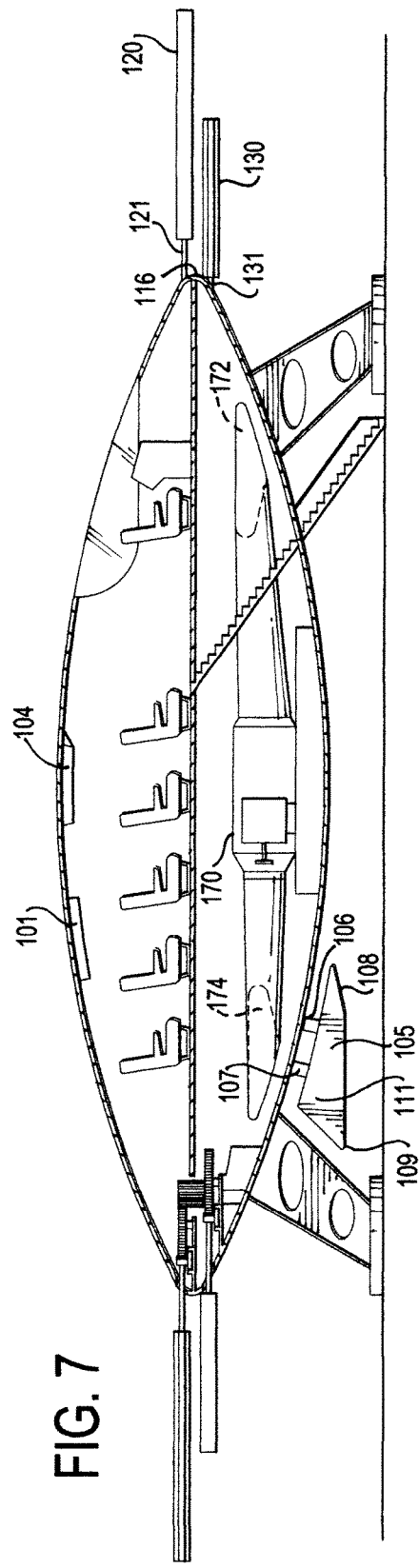
FIG. 7 is a side view of the aircraft with a cutaway portion to illustrate seating and the engine.

Referring to FIGS. 4 and 7, the main lift blades 120 are positioned at or slightly above the outer perimeter 116 of the craft main body 110. The drive system 150 is below the horizontal center line 116 in the lower body 114, which results in a low center of gravity. The pilot and passenger compartment can be above the center line 116 in the upper body 112 and/or in the lower body 114. In addition, six counter-rotation blades 130 are provided at the outer perimeter 116 of the main body 110 and directly below the main blades 120, as best shown in FIG. 2. The main lift blades 120 and the counter-rotation blades 130 create a balanced and low center of gravity craft 100. The main blades 120 and the counter-rotation blades 130 are substantially smaller in length and can be larger in width than the traditional helicopter rotor blades.

In one embodiment, the main blades 120 can be the same size and shape as a small Cessna Aircraft wings. In one embodiment of the invention, the blades 120 can be between 10-15 feet in length and 2-3 feet in width. However, other suitable dimensions can be utilized, greater or smaller, within the spirit of the invention. The length, width and thickness of the blades are contingent upon the size of the craft's main body. However, the great torque advantage achieved by having the drive system at the craft's perimeter (away from the craft's center/vertex) allows for much wider and shorter blades (wings) appropriately designed and sized to achieve lift. In one embodiment, the six main lift blades and the six counter rotation blades are sufficient to provide lift, though more or fewer blades can be provided.

Figure 3:
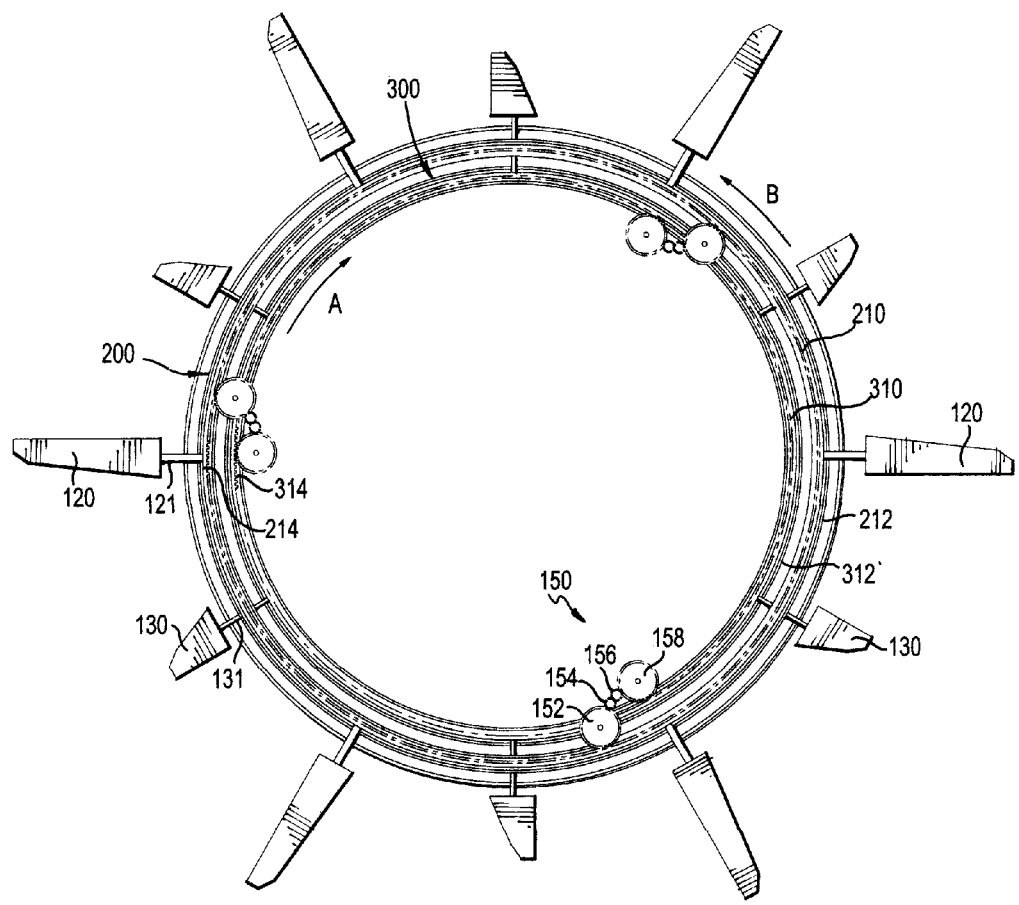
FIG. 3 is a top cross-sectional view of the aircraft showing the gear mechanism.

Turning to FIG. 3, a non-limiting illustrative embodiment of the rotational system is shown having a main rotational assembly 200 and a counter-rotational assembly 300. The main rotational system 200 can be a gear train having an annular gear 210 and one or more planet gears 150. The annular gear 210 can have a ring or base 212 and a plurality of teeth 214. The ring 212 forms a circle that is at the perimeter 116 or substantially concentric with respect to the perimeter 116. The teeth 214 are positioned about the entire circumference of the ring 212 and extend inward from the ring 212 along the inner facing side of the ring 212.

Figure 5:
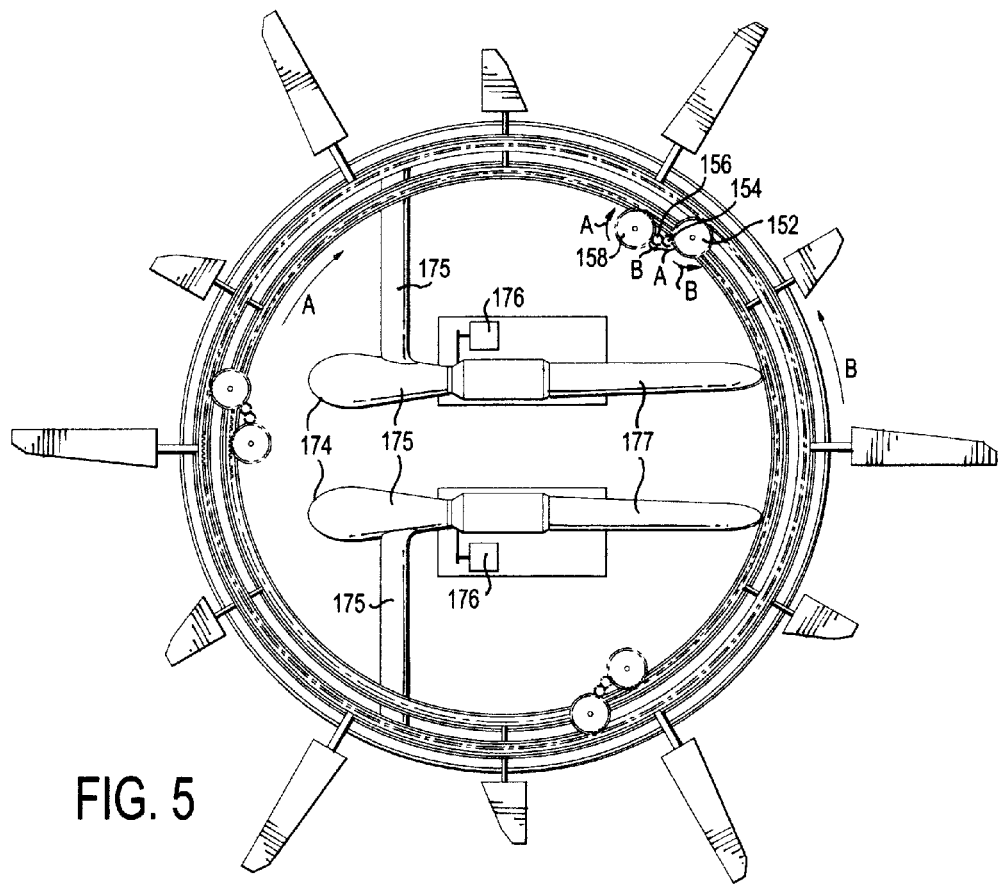
FIG. 5 is a top view showing the engines inside the aircraft.
Figure 6:
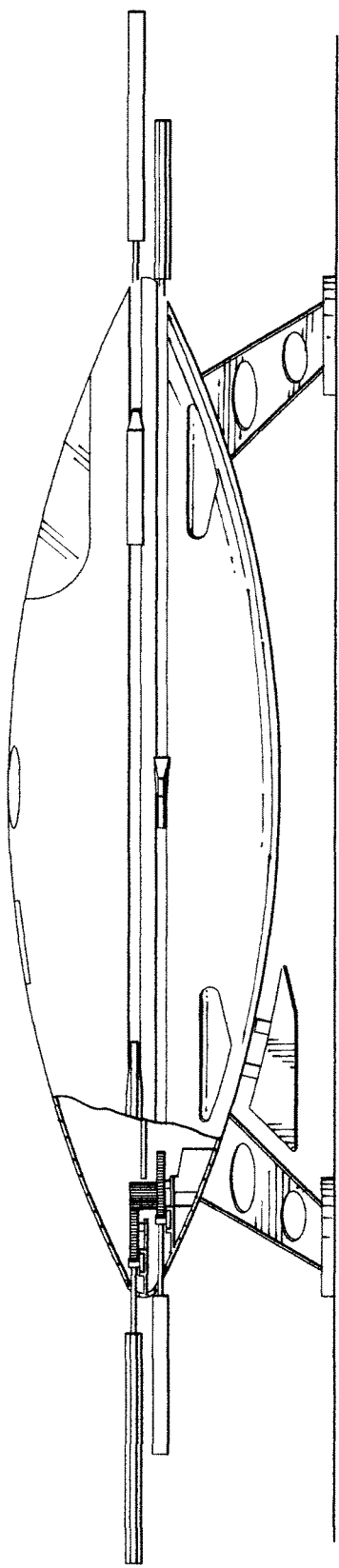
FIG. 6 is a side view of the aircraft, with a cutaway portion of the main body to illustrate the gear mechanisms.

The counter-rotational assembly 300 can also be a gear train having an annular gear 310 and one or more planet gears 150. As best illustrated in FIGS. 3 and 5, at least one (and preferably three) planet gear assemblies 150 (and motors 178) are provided spaced at about 120 degrees from one another. The planet gears 150 can have a drive gear 158 and can also have a driven gear 152 and one or more intermediate gears 154, 156. The annular gear 310 can have a ring or base 312 and a plurality of teeth 314. The ring 312 forms a circle that is substantially concentric with respect to the perimeter 116 and also substantially concentric with the main gear ring 212. In the embodiment shown, the counter-rotational ring 310 is smaller in diameter than the diameter of the main rotational ring 210, so that the main rotational annular ring 210 forms an outer concentric ring and the counter-rotational annular ring 310 forms an inner concentric ring. However, the rings 210, 310 can have the same diameter or the counter-rotational ring 310 can have a larger diameter than the main rotational ring 210. The teeth 314 are positioned about the entire circumference of the ring 312 and extend inward from the ring 312 along the inner facing side of the ring 312.

Turning to FIGS. 4 and 5, two jet turbine engines 170 of appropriate size and thrust capacity can be placed at the internal bottom of the aircraft inside the main body 110, and preferably in the lower body 114. The engines 170 are geared to turn one or more (preferably two) electric generators 176 which develop sufficient electric power for one or more (preferably three) electric drive motors 178. In one embodiment, a separate electric generator 176 can be provided for each of three sets of planet gears 150. At least two jet engines 170 are provided, with each having its own electric generators 176. Air intake ports 172 are provided for the jet turbine, and can be located at or near the front of the craft. Ducts 177 can also be optionally provided from the intake ports 172 to the jet engines (as partially shown in FIG. 5).

Figure 8:
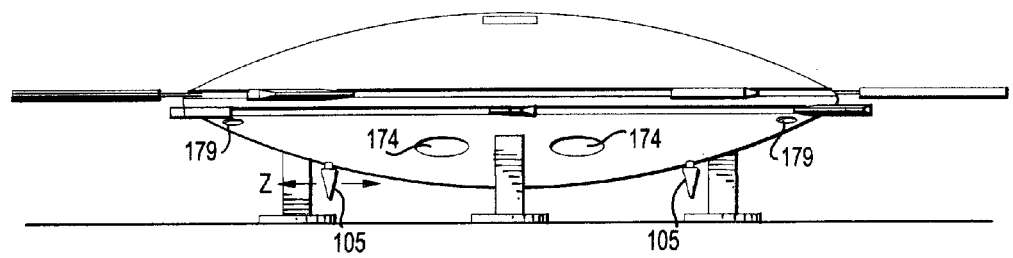
FIG. 8 is a rear view of the aircraft.

The exhaust 174 from the jet turbines has two functions. First, it is used to move the craft in a lateral direction. Second, a portion of the exhaust (such as via one or more optional ducts 175) can be vectored out of side ports 178 at the sides of the craft (see FIG. 8) to work in conjunction with a rudder 105 (FIGS. 7, 8) to turn the craft. The rudder 105 extends downward from the bottom of the lower body 114, preferably toward one end (the rear end) of the craft, such a being positioned below the exhaust 174. A single rudder 105 can be utilized or, as shown in FIG. 8, more than one rudder 105 can be provided with each rudder positioned toward a side of the lower body 114.

The rudders 105 can be elongated with a main body 107 that extends downward from the lower body 114 substantially perpendicular to the outer surface of the lower body 114. The rudder 105 can be tapered outward from the front end 108 to the rear end 109 to have a general triangular shape with a tapered rear end 109. The bottom edge 111 of the rudder 105 can be relatively straight. The rudders 105 can be attached to the lower body 114 by one or more control bars 106 that the pilot can control to adjust the positioning of the rudders 105. The rudders 105 can pivot about one of the control bars 106 so that the front end 108 of the rudder remains relatively fixed and the rear end 109 of the rudder 105 moves side-to-side and/or pivot upward/downward with respect to the lower body 114. Or both the front and rear ends 108, 109 can move side-to-side and/or pivot upward (as shown by arrow Z in FIG. 8) with respect to the lower body 114. The rudder 105 deflects the air and/or creates a wind pattern to move the craft 100 in a desired direction. Thus, the rudders 105 can be controlled by the pilot to move the craft 100 in any suitable direction.

It should further be appreciated that the main body 110 can have other suitable sizes and/or shapes, and that the blades 120, 130 can be driven in other suitable manners. And, the blades 120, 130 can be configured in different manners (with or without an outer and/or inner gear ring 210, 310) within the scope of the invention. It should be further appreciated that other suitable techniques can be provided to drive the gears 150, such as turbine engines, turboshaft engines or engines that run on gasoline, jet fuel, or nitromethane.

As further shown in FIGS. 4, 5, a separate electric motor 178 can be provided for each set of the planet gears 150. Each of the planet gears 150 have its own set of teeth that protrude outward and engage one or more respective gears, and also can be mounted to a respective pin or shaft that is mounted to a support or the body 110 to enable the gear 150 to freely rotate. The electric motor 178 can be coupled to a shaft that is connected to a drive gear 158, so that the motor 178 rotates the shaft and associated drive gear 158. The teeth of a first intermediate gear 156 rotationally engage the teeth of the drive gear 158, and the teeth of a second intermediate gear 154 rotationally engage the teeth of the first intermediate gear 156. And the teeth of the second intermediate gear 154 rotationally engage the teeth of the driven gear 152.

As the motor 178 rotates the drive gear 158 in a first direction A, it turns the first intermediate gear 156 in a second direction B opposite to the first direction A, which turns the second intermediate gear 154 in the first direction A, which turns the driven gear 152 in the second direction B. The drive gear 158 is located inside the counter-rotational annular gear 310 and the teeth of the drive gear 158 engage the teeth 314 of the counter-rotational annular gear 310 to rotate the counter-rotational annular gear 310 in the first direction A. In addition, the driven gear 152 is located just inside the main annular gear 210 and the teeth of the driven gear 152 engage the teeth 214 of the main annular gear 210 to rotate the main annular gear 210 in the second direction B. Thus, the counter-rotational annular gear 310 rotates in the opposite direction than the main annular gear 210.

The gears 152, 154, 156, 158 rotate at the same time to simultaneously drive the annular rings 210, 310 (as well as the respective blades 120, 130). The gears 152, 158 are the same size and gears 154, 156 are the same size, so that the gears 150 drive the annular rings 210, 310 at the same speeds. The same speed and operation of the rings 210, 310 provides stabilization of the aircraft by the counter-rotation blades 130, while at the same time providing sufficient lift by the main blades 120. It will be appreciated, however, that the planet gears 150 need not be coupled together and drive by a single motor, but instead the annular rings 210, 310 can be driven by separate planet gears and motors. And, the planet gears 150 can be configured to drive the annular rings 210, 310 at different speeds.

The six main lift blades 120 are spaced approximately 60 degrees apart from one another and are affixed respectively to the ring gear 210 by a shaft 121 that extends outward (preferably beyond the outer perimeter 115). And six counter-rotation blades 130 are spaced at 60 degrees from one another and also are coupled to an inner facing perimeter ring/planetary gear 310 by a shaft 131 that extends outward (preferably beyond the outer perimeter 115), just below ring gear 116. The counter-rotation blades 130 can be positioned between the main blades 120 (FIG. 3), or can be at any other suitable relative position such as being aligned.

In this manner, the counter-rotational blades 130 rotate in the opposite direction as the main blades 120, so that the counter-rotation blades 130 offset the torque of the main rotor blades 120. The counter-rotational blades 130 are smaller than the main rotor blades 120 since the main blades 120 are the primary source for lift, whereas the counter-rotational blades 130 are mostly utilized as anti-torque. It should be recognized that the blades 120 need not all be the same size and the blades 130 need not all be the same size, and one or more of the counter-rotational blades 130 can be the same size or larger than the main blades 120. And, any suitable number of blades 120, 130 can be provided, and the number of main blades 120 need not be the same as the number of counter-rotational blades 130.

The rings 210, 310 can be positioned inside the aircraft body 110 and the blades 120, 130 can project outside the body 110 through an annular channel. The blades 120, 130 extend substantially perpendicularly and horizontally outward from the body 110.

It will be readily apparent that although six main blades 120 and six counter-rotation blades 130 are provided, any suitable number of blades 120, 130 can be provided within the spirit and scope of the invention. In addition, there need not be an equal number of main blades 120 as counter-rotation blades 130. And while the counter-rotation blades 130 are shown smaller than the main blades 120, any suitable size and configuration of those blades 120, 130 can be utilized. Further, the need for standard mast tilt assemblies is not necessary for the main blades since the craft's lateral movement is achieved by the main jet turbine thrust out the rear of the craft (FIG. 8) while lift is achieved by permanently affixing the main blades to an angle of attack appropriate for lift. That is, in the embodiments shown the blades 120, 130 are permanently fixed in a stationary position to the annular gears 210, 310. However, in another embodiment the blades 120 and/or 130 can be pivotally fixed to the annular gears 210, 310, so that the blades 120 and/or 130 can pivot forward and backward with respect to the annular ring 210, 310 (i.e., the shaft 121, 131 can turn with respect to the annular ring 210, 310). This can be used to create directional movement, whereby the pilot can control the shaft 121, 131 to turn to propel the aircraft in any desired direction. This can be provided by itself or in combination with the use of the rudder 105, or the rudder 105 can be provided by itself without the pivoting of the blades 120, 130.

The main blades 120 and counter-rotation blades 130 rotate about the entire outer circumference of the aircraft main body 110 and are connected to the annular gear rings 210, 310, respectively. As further shown in FIG. 4, the annular gears 210, 310 can be relatively flat with a bottom surface that rests and rotates by rolling on one or more roller bearings 122, 124, though preferably a plurality of roller bearings 122, 124 are provided about the entire periphery of the body 110. The roller bearings 122, 124 can be affixed to the crafts internal airframe on support struts 126, 128, respectively. The support struts 126, 128 can be used in appropriate quantity and spacing about the inner perimeter of the craft as required to support the roller bearings 122, 124 and the annular gears 210, 310. In addition, a channel can be provided in the support struts 126, 128 to receive the roller bearings 122, 124, and the roller bearings 122, 124 can ride in the channels.

As still further shown in FIG. 4, the main rotor blades 120, as well as the annular rotor 210 and driven gear 152, can be positioned at a first vertical position and a first horizontal position within the body 110. And the counter-rotational blades 130, as well as the annular rotor 310 and drive gear 158, can be positioned at a second vertical position and a second horizontal position within the body 110 that is different than the first vertical and horizontal positions. Thus, the main rotor blades 120 can be vertically offset with respect to the counter-rotational blades 130, and the annular gear 210 and driven gear 152 can vertically offset (and horizontally offset) with respect to the counter-rotational annular gear 310 and drive gear 158. And the electric motors 178 can be positioned below the counter-rotation drive gears 158.

Thus, the main blades 120 are at an upper position and the counter-rotational blades 130 are at a lower position, so that the main blades 120 and the counter-rotation blades 130 do not interfere with each other. As illustrated, one or both of the intermediate gears 154, 156 (the second intermediate gear 156 is behind the first intermediate gear 154 in the embodiment of FIG. 4) is can be elongated in the vertical direction (as a tube or cylinder) to span the vertical gap between the drive gear 158 and the driven gear 152.

The entire drive/propulsion system (FIGS. 4, 5) 150 is housed within the main body 110 and preferably below the center horizontal line (FIGS. 2, 4) 116 of the main body 110. The main blades 120 are shown just at or above the center line 116, but can also be provided below the center line 116. And, the main blades 120 and counter-rotation blades 130 can both be located below the center line 116, and can also extend out beyond the outer periphery of the main body 110.

It is further noted that a processing device and related control mechanisms at the pilot seat can be provided to control operation of the aircraft, including the speed of the blades 120, 130, maneuvering, speed, and stability. As will be apparent to those skilled in the art, the invention can be utilized for other suitable applications beyond helicopter designs.

With respect to the shortened blades (wings) 130, the required RPM to generate lift for this craft will be substantially lower than in traditional helicopters since the blades are substantially wider and will achieve a greater lift coefficient per unit of surface area than traditional blades. In current helicopters, the RPM required for lift ranges from 460-600 RPM. The present invention will require approximately only 70-80 RPMs to achieve vertical lift for takeoff. This calculation is based upon examining the take-off air speed of both small aircraft and commercial aircraft and associates those speeds with the necessary blade speed of this invention. Typically, small aircraft (such as a Cessna single engine etc. . . . ) require between 70-100 MPH for takeoff and larger commercial aircraft (Jets) require approximately 140-180 MPH. Considering a variant of the present invention had a main body of 30 feet in diameter with main lift blades at 10 feet in length, the resulting circumference of outermost blade travel in its rotation for one revolution would be 157 feet. If the main lift blades travelling 157 feet equates to one revolution and we multiply 70 (RPM)×157, the result is 10,990 feet travelled in one minute. This equates to approximately 120 MPH, which is the average take off speed between small aircraft and commercial jets.

With the main lift blades 130 at the horizontal center line of craft, a parachute 104 (or multiple parachutes) can be located at the top of the craft's airframe superstructure, as shown in FIG. 7. A compartment can be provided at the top of the upper body 112, and the compartment can be opened to release the parachute 104. The compartment can be opened by the pilot or can open automatically when the craft control system detects that the craft is rapidly losing altitude or is otherwise out of control, such as in the event of a catastrophic power or mechanical failure. The parachute 104 provides a non-fatal landing. Additionally, based upon the aircraft's design and low center of gravity, in the event of an emergency water landing, the craft will not flip over and more importantly, will float upright for a sustained period of time allowing passengers/pilot escape from a hatch 101 (FIG. 7) located at the top of the craft.

Since the craft's lift and counter-rotation blades are at the perimeter of the horizontal center line of craft, weapon systems can be imbedded on both the bottom and top of the craft allowing a nearly full spherical 360 degree deployment. With the lift and counter-rotation blades being very short and close to the craft's main superstructure, the availability of suitable landing zones is greatly increased. In addition, since the proposed mechanical and blade lift mechanism achieves greater lift per unit of horsepower, a greater level of armoring on lower airframe can be used to protect craft from ground fire. Finally, the craft can easily be configured in a drone capacity and remotely piloted.

Figure 9:
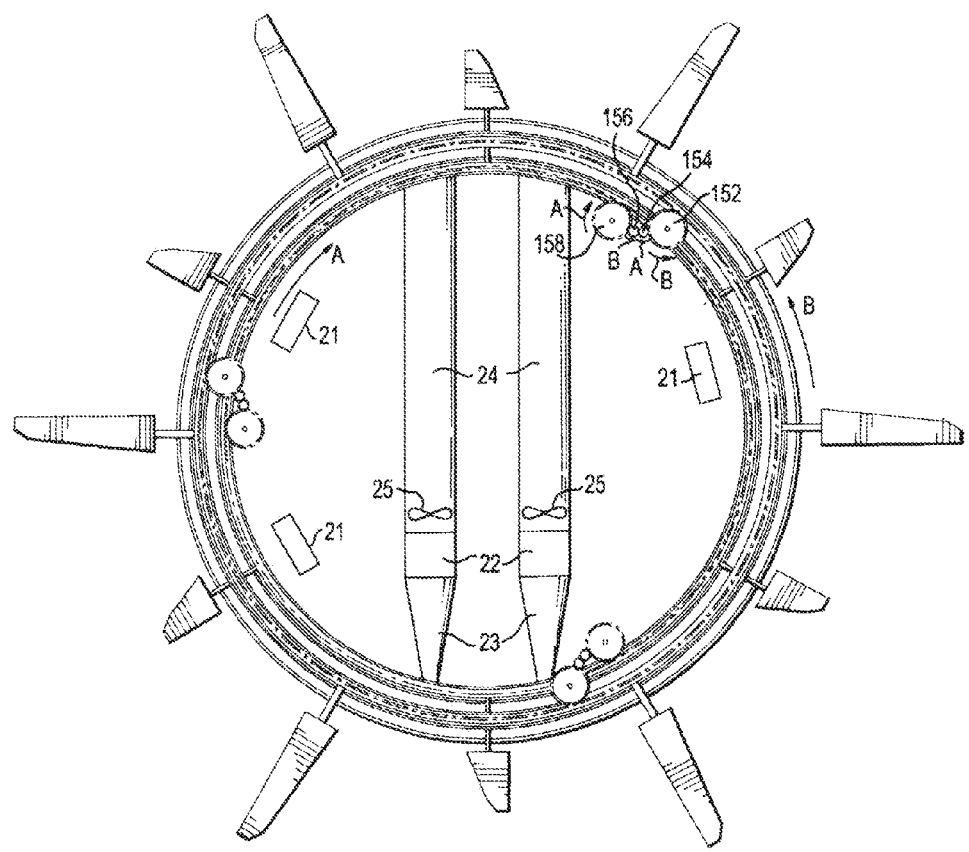
FIG. 9 is a top cross-sectional view of a drone aircraft in accordance with the invention.

Turning to FIG. 9, the craft is shown more particularly configured in a drone capacity. Here the craft 500 is configured as a drone and can be operated, for instance, by remote control. The drone 500 is similar to the craft 100 of FIGS. 1-8 with regard to the general configuration of the craft, including the main body 110, landing 119, blades 120, 130, gears 150, rotational assembly 200, and counter rotation assembly 300. Thus for instance, the drone 500 looks the same as the manned aircraft 100 in FIGS. 1-8, but substantially smaller. But the drone need not have various other elements, such as the escape hatch 101 and stairs 119. And the engine 172 need not be a jet turbine engine, but can be substantially lower powered engine or motor.

When the lift and drive system of the invention is applied to rotor type drone/UAV craft, the stability and efficiency as a platform is greatly enhanced similar to that achieved by the helicopter variant shown and described with respect to FIGS. 1-8.

By applying the concept of FIGS. 1-8 to rotor drones/UAVs, whereby both the main and counter-rotation rotation blades emanate from and move about the perimeter of the craft, not the center vertex, great fight stability is achieved. Additionally, more than one electric motor 178 can be provide, so that the failure of any single motor will not diminish the operation of the main or counter rotation blades 120, 130, since the other motors 178 can compensate for the failed motor 178 (for instance, by increasing the rotations per minute of the other motors 178). The unmanned drone/UAV of the present invention differs from the lift and drive systems of FIGS. 1-8 only in the manner in which it is powered. For instance, since the craft 500 is substantially smaller and lighter than the manned aircraft 100, it can be powered by a much smaller motor(s) (e.g., it can be battery powered), to drive the blades 120, 130 via the assemblies 200, 300 and gears 150. Thus, the jet engine and electric generator need not be provided. The motors 178 can be gas-powered or powered by batteries, such as batteries 21.

Figure 10:
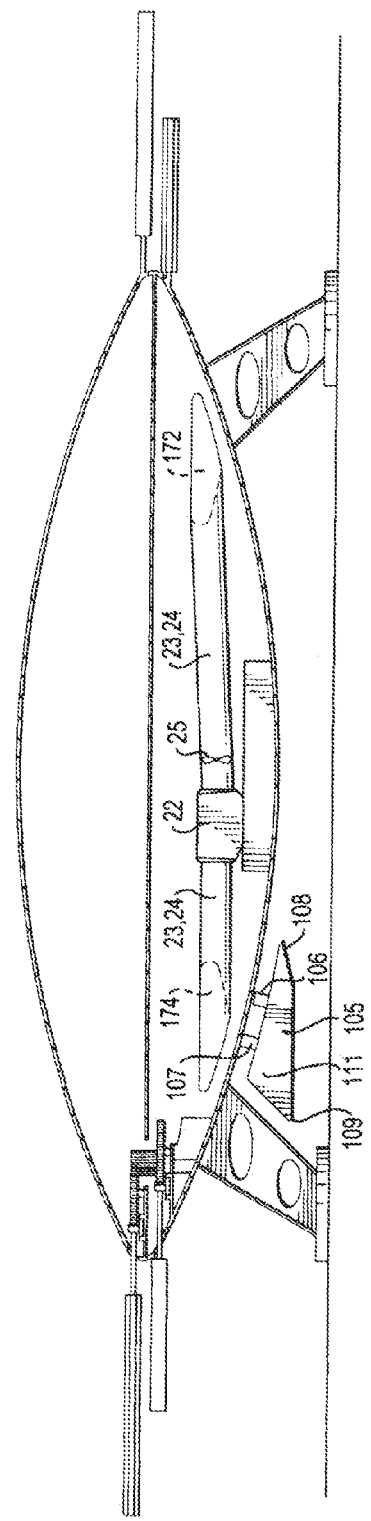
FIG. 10 is a side view of the drone aircraft.

Referring to FIGS. 9-10, drive blades/fans 25 are mounted within the ducts 24 located in the bottom of the craft 500. The one or more batteries 21 are used to power one or more electric motors 22 that are used to drive the fans 25. As with FIGS. 2, 4, 7, 8, the ducts 23, 24 are in air flow communication with intake and exhaust openings 172, 174. Accordingly, the fans 25 pull air in through the intake, and out through the exhaust. In FIGS. 9-10, the motors 22 can be located inside the ducts 24, or adjacent to the ducts 24, and can be adjacent either the intake or exhaust openings. At one end, the ducts 24 can be connected to an intake duct 23, which is attached to the intake port 172. At an opposite end, the ducts 24 can be connected to the exhaust port 174.

The fans 25 achieve lateral movement and turning of the drone/UAV craft 500. The wind/thrust from these blades/fans 25 pushes the craft 500 in a lateral direction. To facilitate turning the craft, two functions can be applied. First, the RPM level of either motor 22 can be increased so as to cause the craft to turn. Second, the increased RPM level of either motor operating in conjunction with the two rudders 105 (in conjunction with the control bars 106) that are affixed to the craft's lower airframe, as best shown in FIGS. 2, 7. Those rudders 105 facilitate turning of the craft 500.

In addition, the drone/UAV 500 is much smaller than the manned variant so accordingly, all the components such as the crafts fuselage (if needed), drive motors, lift blades etc. . . . will be smaller. Likewise, if the drone/UAV 500 is of significant size so as to not warrant battery use, the original application's power generation scheme can be used applying smaller jet engines linked to appropriately smaller electric generators.

Still further, the drone craft 500 includes components needed to communicate with a user remote control device. For instance, the craft 500 can have a wireless receiver to receive signals from the user remote control device. The receiver can communicate by radio frequency (RF), infrared (IR), Bluetooth, or any other suitable frequency or wireless communication. The craft 500 can also have a control mechanism, such as a processing device or controller, that receives the command signals from the user remote control device, and controls operation of the drone craft 500. For instance, the controller can control operation of the motors 22 to work the fans 25, and motors 170.

GLOSSARY OF TERMS 100, aircraft; 101, escape hatch; 104, parachute; 105, rudder; 106, control bars for rudder; 107, main body of rudder; 108, front end of rudder; 109, rear end of rudder; 110, main body of craft; 112, upper body of craft; 114, lower body of craft; 115, outer periphery of craft; 116, general horizontal centerline of craft; 118, landing struts; 119, stairs; 120, main lift blades; 121, connector bars linking annular gear to main lift blades; 122, roller bearings for main lift blades annular gear; 124, roller bearings for counter rotation blades annular gear; 126, support strut for roller bearing supporting main rotation blades annular gear; 128, support strut for roller bearing supporting counter rotation blades annular gear; 130, counter rotation blades; 131, connector bars linking annular gear to counter rotation blades; 150, general overall set of drive gears; 152, driven gear; 154, intermediate gears; 156, intermediate gears; 158, drive gear; 170, jet turbine engines; 172, intake port for jet turbines; 174, exhaust ports for jet turbine engines; 175, ducts; 176, electric generators; 177, ducts; 178, electric drive motors; 200, overview of main rotational assembly; 210, main annular gear for main lift blades; 212, base I frame structure of annular gear for main lift blades; 214, teeth of annular gear 210; 300, counter rotation assembly; 310, annular gear for counter rotation blades; 312, teeth of annular gear 310; 500, drone aircraft.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A drone aircraft comprising:
a main body having a circular shape with a circular outer periphery;
one or more rotor blades extending substantially horizontally outward from said main body at or about the circular outer periphery, said one or more rotor blades rotating in a first direction;
a first annular gear located at or about the outer periphery and coupled to said one or more rotor blades;
one or more counter-rotation blades extending substantially horizontally outward from said main body at or about the circular outer periphery, said one or more counter-rotation blades rotating in a second direction opposite the first direction;
a second annular gear located at or about the outer periphery and coupled to said one or more counter-rotation blades;
a motor configured to drive said first annular gear and second annular gear to drive said one or more rotor blades and said one or more counter-rotation blades, wherein said motor is located directly adjacent at least one of the first annual gear and the second annular gear;
a first planet gear directly coupled to the motor to drive said first annular gear;
a second planet gear coupled to the first planet gear to drive said second annular gear;
a receiver for receiving command signals from a remote controller; and
a controller controlling the motor in response to the received command signals.

2. The drone aircraft of claim 1, further comprising at least one intermediate gear engaging the first and second planet gears to simultaneously rotate the first and second planet gears.

3. The drone aircraft of claim 1, wherein the first annular gear is located above the second annular gear, and the one or more rotor blades are located above the one or more counter-rotation blades.

4. The drone aircraft of claim 1, wherein the first annular gear is vertically offset from the second annular gear.

5. The drone aircraft of claim 1, further comprising landing gear located at a bottom portion of the main body.

6. The aircraft of claim 1, further comprising a rudder coupled to the main body to control steering the aircraft.

7. The aircraft of claim 1, further comprising a plurality of motors each configured to drive said first annular gear and second annular gear to drive said one or more rotor blades and said one or more counter-rotation blades, wherein each of said plurality of motors is located directly adjacent at least one of the first annual gear and the second annular gear.

8. The aircraft of claim 1, wherein said one or more rotor blades are fixed with respect to the first annular gear and said one or more counter-rotation blades are fixed with respect to the second annular gear.

9. A method of operating a drone aircraft, comprising:
providing a main body having a circular shape with a circular outer periphery;
providing one or more rotor blades extending substantially horizontally outward from the main body at or about the circular outer periphery;
providing a first annular gear located at or about the outer periphery and coupled to said one or more rotor blades;
providing one or more counter-rotation blades extending substantially horizontally outward from the main body at or about the circular outer periphery;
providing a second annular gear located at or about the outer periphery and coupled to said one or more counter-rotation blades;
providing a motor directly adjacent at least one of the first annual gear and the second annular gear;
providing a first planet gear directly coupled to the motor to drive said first annular gear;
providing a second planet gear coupled to the first planet gear to drive said second annular gear;
driving the first planet gear by the motor, to rotate the first annular gear and rotate the one or more rotor blades in a first direction; and
driving the second planet gear by the first planet gear, to rotate the second annular gear and rotate the one or more counter-rotation blades in a second direction opposite the first direction;
receiving at a receiver command signals from a remote controller; and
controlling by a controller the motor in response to the received command signals.

10. The method of claim 9, further wherein the step of rotating the one or more rotor blades is simultaneous with the step of rotating the one or more counter-rotation blades.

11. The method of claim 9, further comprising providing a rudder at the main body to control steering the aircraft.

12. The method of claim 9, further comprising providing a plurality of motors, each configured to drive the first annular gear and second annular gear, wherein each of the plurality of motors is located directly adjacent at least one of the first annual gear and the second annular gear.

* * * * *